United States Patent
Wu et al.

(10) Patent No.: US 6,292,307 B1
(45) Date of Patent: Sep. 18, 2001

(54) AUTOMATICALLY FOCUSING AN OPTICAL INSTRUMENT HAVING A LENS WITH ONLY TWO FOCUS POSITIONS

(75) Inventors: Jing Wu, NSW; Xing Zhang, Menai; Igor Kharitonenko, NSW, all of (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/606,136

(22) Filed: Jun. 28, 2000

(51) Int. Cl.[7] .................................................. G02B 15/14
(52) U.S. Cl. ............................................................ 359/698
(58) Field of Search ...................................... 359/698, 697; 382/255, 291; 348/345

(56) References Cited

U.S. PATENT DOCUMENTS

| | | | |
|---|---|---|---|
| 5,570,433 | * 10/1996 | Nagamine et al. | 382/255 |
| 5,835,641 | * 11/1998 | Sotoda et al. | 382/291 |
| 6,002,706 | * 12/1999 | Staver et al. | 372/108 |
| 6,014,455 | * 1/2000 | Sumiyoshi et al. | 382/144 |

* cited by examiner

Primary Examiner—Ricky Mack
(74) Attorney, Agent, or Firm—Douglas D. Fekete

(57) ABSTRACT

A method (20) for automatically focusing an optical instrument (1) having a lens (10) with only two focus positions. The method comprises acquiring a first image (21) when the lens (10) is in a first position (15) and thereafter processing pixel light intensities (22) of part of the image to provide a focus detection value indicative of image blurr. A threshold test (23) is then effected and if the focus detection value is outside a desired range the lens (10) is automatically moved to a second position (16).

14 Claims, 2 Drawing Sheets

AUTOMATICALLY FOCUSING AN OPTICAL INSTRUMENT HAVING A LENS WITH ONLY TWO FOCUS POSITIONS

FIELD OF THE INVENTION

This invention relates to automatically focusing an optical Instrument having a lens with only two focus positions. The invention is particularly useful for, but not necessarily limited to, a digital still or video image camera applications.

BACKGROUND OF THE INVENTION

A number of cameras, both for taking video and/or still digital images have photo sensors located at the focal plane of the camera to acquire an image focused onto the focal plane by a lens. In some cameras an electric motor moves the lens relative to the focal plane of the camera in order to adjust the focus of the image at the focal plane. In cheaper cameras, the lens is designed to function over a wide range of object distances so that the objects are reasonably focused on the focal plane without requiring the lens to be moved at all, although this necessarily reduces the actual sharpness of the image and is therefore not suitable for higher quality cameras.

For digital still and video cameras, autofocusing is a known technique which can be achieved by analysing the sharpness of captured images. By comparing edge and/or high frequency signals in the images captured at different lens positions, the best lens position with a peak of image sharpness can be determined.

As portable communicators become more complex and may have video capabilities, an attached digital camera with autofocus functionality would be very useful. However, for portable devices, power consumption needs to be as low as possible, whereas both the electric motor for driving a lens and the computation required to determine autofocus using known techniques consumes significant power. Furthermore, the current autofocus detection techniques involve quite complex calculations requiring many images to be captured and analysed at different lens positions in order to find the peak of sharpness.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE DRAWINGS

Figure 1:
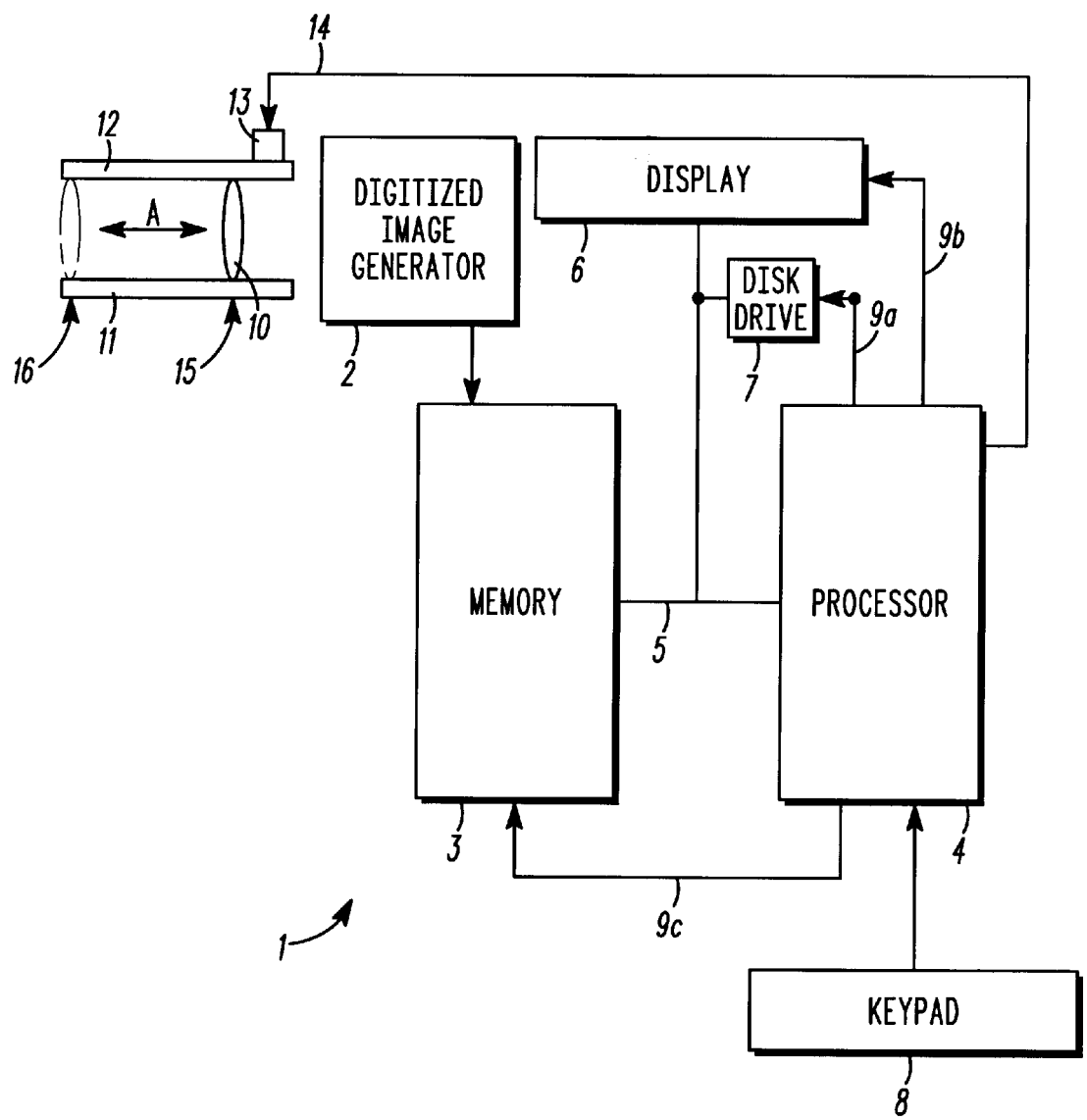
FIG. 1 is a schematic block diagram of an optical instrument in accordance with a preferred embodiment of the invention.

With reference to FIG. 1 there is illustrated an optical instrument in the form of a digital camera 1 comprising a digital image generator 2 having outputs coupled to a memory 3. The digital image generator 2 is typically a Charged Coupled Device as will be apparent to a person skilled in the art. The memory 3 is coupled to a processor 4 by a bus 5. A display 6 and disc drive 7 are also coupled to processor 4 by bus 5 and a user interface, in the form of a keypad 8, has outputs connected to processor 4. A as will be apparent to a person skilled in the art, control lines 9a,9b,9c connect outputs of processor 4 to inputs of memory 3, display 6 and disc drive 7. The digital camera 1 also has a two position lens 10 movably mounted to parallel tracks 11 and 12.

Track 11 allows for sliding movement of lens 10 in directions illustrated by arrowed line A from a first position 15 where the lens 10 is illustrated to a second position 16 where the lens 10 shown in phantom. The first position 15v and second position 16 are the only two focus positions of the lens 10. Track 12 has a worm drive (not illustrated) operatively coupled to a drive module 13, typically an electric motor, and the lens 10 is coupled to the worm drive to thereby provide movement of lens 10 in directions illustrated by arrowed line A. The drive module is coupled to processor 4 by a control line 14. As will be apparent to a person skilled in the art, the drive module 13 includes suitable lens position control circuitry and suitable buffering of the control line 14.

Figure 2:
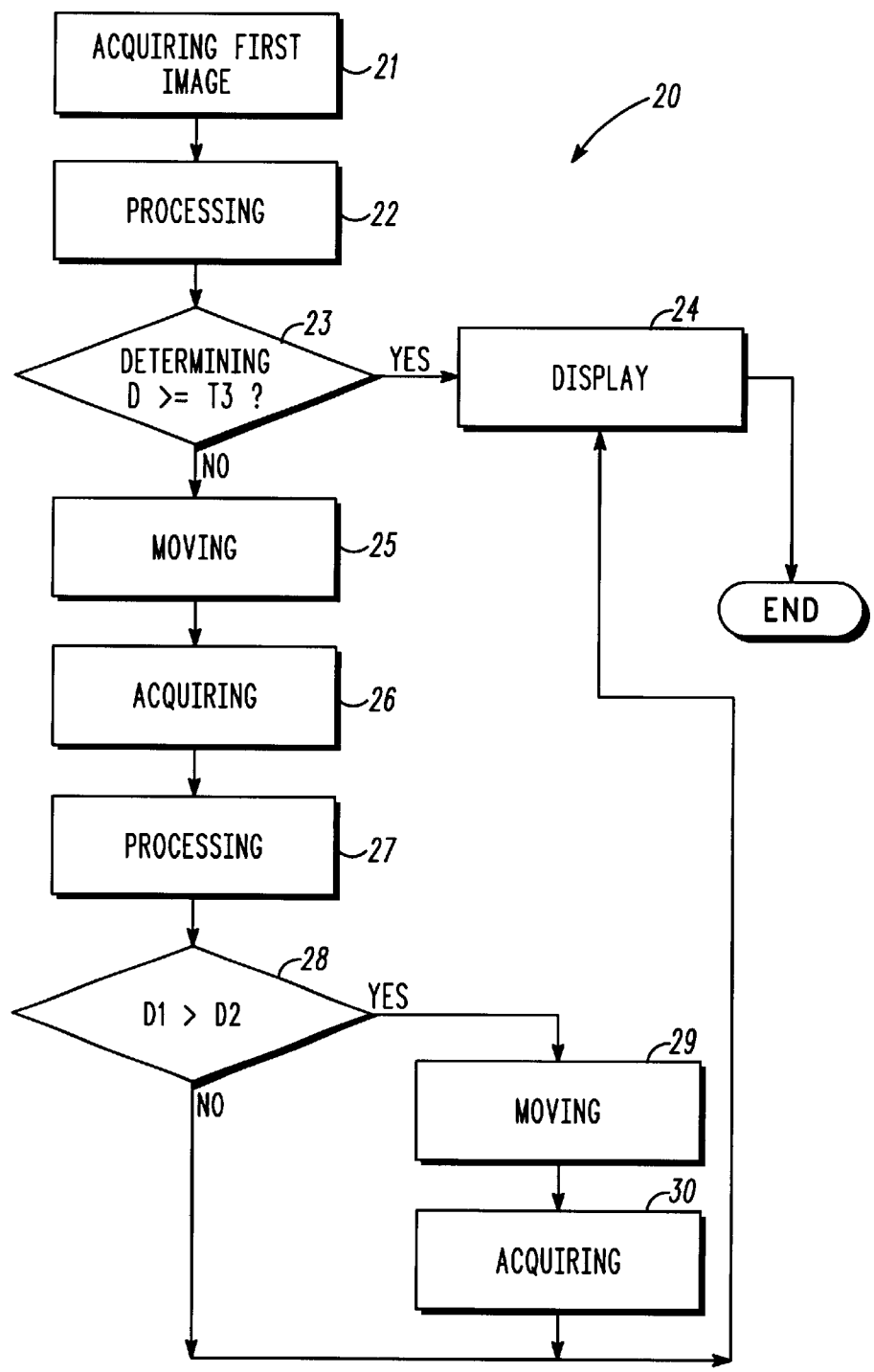
FIG. 2 is flow diagram illustrating operation of the optical instrument of FIG. 1.

Referring to FIG. 2, there is illustrated a method 20 for automatically focussing the digital camera 1. The method 20 includes acquiring a first image I at step 21 when lens 10 is in the first position 15. The first image I is acquired by the digital camera 1 by the digital image generator 2 whereby the acquired first image I is mapped to an array of pixels to be displayed on display 6. After step 21 a processing step 22 is effected by processor 4 in which pixel light intensities of at least part of the first image I are processed to provide a focus detection value indicative of blurr in the first image I. The focus detection value is determined based upon values obtained from non-overlapped windows that can be displayed on display 6. Each window can be considered as an array of Image pixels I[i,j] with coordinates i and j. Accordingly, for each widow there are obtained first light intensity variation values g(i,j) indicative of variations in pixel light intensities in a localized area of first image I and second light intensity variation values q(i,j) indicative of variations in pixel light intensities in the localized area of first image I. In this regard, the first light intensity variation values g(i,j) and the second light intensity variation values q(i,j) obtained by different methodologies or formulas. The first light intensity variation values q(i,j) are based upon differences in intensity variations for every one of the image pixels I[i,j] in close proximity to each other in a localized area and is calculated by equations—(1) as follows:

$$g_h = [I(i-2, j) - I(i+2, j)]^2, \, g_v = [I(i, j+2) - I(i, j-2)]^2 \quad (1)$$

$$g(i, j) = \begin{cases} g_h + g_v, & \text{if } g_h > T_0 \text{ or } g_v > T_0 \\ 0, & \text{otherwise} \end{cases}$$

where $g_h$ are horizontal light intensity variation values; $g_v$ are vertical light intensity variation values; and $T_0$ is a threshold for discriminating the flat areas in which there is little difference in pixel light intensities between pixels in highly localized areas.

The second light intensity variation values q(i,j) are based upon differences in pixel light intensities relative to light intensities of pixels in close proximity to each other and is calculated by equations—(2) as follows:

$$M(i, j) = 8 \times Median(I(i+m, j+n)), \quad (2)$$

where $m, n = \{-1, 0, 1\}$ $$q(i, j) = M(i, j) - \sum_{m=-1}^{1} \sum_{n=-1}^{1} I(i+m, j+n),$$

when $m \neq 0$ and $n \neq 0$

After the first light intensity variation values g(i,j) and second light intensity variation values q(i,j) have been obtained for every image pixel I[i,j] in every selected window, the focus detection value is calculated by processor 4 determining a ratio R for each window which is used to obtain a weighted value Xk associated with at least some of the windows after which the weighted value Xk is used to determine the focus detection value D. The ratio R is determined by equation—(3) as follows:

For each window and assuming a square window with w row and w column pixels then $$R = \frac{\sum_{i,j=0}^{w} g(i,j)}{\sum_{i,j=0}^{w} q^2(i,j)} \quad (3)$$

In order to filter at least some potential errors, due to flat areas, in the determined ratio R for specific windows, it is useful to typically select only subset the ratios R. For example, if there are 24 ratios R each associated with a window, then N of the ratios R with the lowest values will be selected for calculating the weighted values $X_k$, k=1, 2, ... ,N by equation—(4) as follows:

$$X_k = \begin{cases} 1 & \text{if } R_k \leq T_1 \\ \frac{T_2 - R_k}{T_2 - T_1} & \text{if } T_1 < R_k < T_2 \\ 0 & \text{if } R_k \geq T_2 \end{cases} \quad (4)$$

where $T_1$, $T_2$ are thresholds.

After calculating the weighted value $X_k$, the focus detection value D (which is basically an averaging of all the selected weighted values $X_k$ of ratios R) is determined by formula—(5) as follows $$D = \sum_{k=1}^{N} \frac{X_k}{N} \quad (5)$$

In two extreme cases, if D=0 the image I is very blurred and when D=1, the image I is well focused.

After the processing step 22 a determining step 23 is effected by processor 4 to determine if the focus detection value D is within a desired range. This is determined by the desired range having a boundary identified by a threshold value T3. Accordingly, the focus detection value D is compared with the threshold T3. If the focus detection value D>=T3, then the image is deemed focused and is therefore displayed at a display step 24 on display 6 and at the option of a user entering commands by keypad 8, the image can be stored on a the disk in disk drive 7 or in the memory 3. Alternatively, if at the determining step 23 the focus detection value D<T3, the first image I is deemed blurred and a moving step 25 is effected which automatically moves the lens 10 from the first position 15 to the second position 16 or vice versa. In this regard, the lens 10 is moved from the first position 15 to the second position 16 only when the focus detection value D is outside of the desired range.

If the moving step 25 is effected then an acquiring a second image step 26 will be effected when the lens 10 is in the second position 16. A processing step 27 is then effected by processor 4 in which pixel light intensities of at least part of the second image I are processed to provide a focus detection value indicative of blurr in the second image I. The processing step 27 is basically identical to processing step 22 and to avoid repetition details of this step 27 are not described. After processing step 27 is completed a focus detection value D2 for the second image I will be determined and a decision step 28 is effected that compares the focus detection value D1 for the first image with the focus detection value D2 for the second image. If D1>D2 then the lens 10 is moved back to the first position 15 at a moving step 29 as the with the focus detection value D2 for the second image is deemed unacceptable. An image I is then obtained at an acquiring step 30 and the image is focused at the first position 15 is displayed at step 24. Alternatively, if D1=<D2 then the lens 10 does not move back to the first position 15 focus detection value D for the second image is deemed acceptable and displayed at display step 24. The method then terminates at an end step 30. It should be noted that if the image I acquired at step 21 is retained in memory 3, then after decision step 28 there is no need for the moving step 29 and acquiring step 30 as the image I from acquired at step 21 can be displayed at step 24.

Advantageously, the present invention provides for relatively quick and simple automatically focusing an optical instrument having a lens with only two focus positions. Furthermore, although the invention has been described with reference to a preferred embodiment, it is to be understood that the invention is not restricted to the particular embodiment described herein.

What is claimed is:

1. A method for automatically focusing an optical instrument having a lens with only two focus positions, the method comprising the steps of:

acquiring an image when the lens is in a first position;

processing pixel light intensities of at least part of said image to provide at least one focus detection value indicative of blurr in said image;

determining if said focus detection value is within a desired range; and automatically moving the lens to a second position only when said focus detection value is outside of said desired range.

2. A method of autofocusing a two-position lens according to claim 1, wherein said image is a first image, and the method further comprising the steps of:

acquiring a second image when said lens is in said second position;

processing pixel light intensities of at least part of said second image to provide a focus detection value indicative of blurr in said second image; and moving said lens back to said first position if said focus detection value indicative of blurr in said second image is unacceptable.

3. A method of autofocusing a two-position lens according to claim 2, wherein said focus detection value indicative of blurr in said second image is unacceptable when said focus detection value indicative of blurr in said first image is closer to said range than said focus detection value indicative of blurr in said second image.

4. A method of autofocusing a two-position lens according to claim 1, wherein said desired range has a boundary identified by a threshold value.

5. A method of autofocusing a two-position lens according to claim 1, wherein said step processing includes the steps of:

obtaining first light intensity variation values indicative of variations in pixel light intensities in a localized area of said image and second light intensity variation values indicative of variations in pixel light intensities in said localized area of said image, said first light intensity variation values and said second light intensity variation values being obtained by different methodologies; and using at least some of said first light intensity variation values and said second light intensity variation values to provide said at least one focus detection value.

6. A method of autofocusing a two-position lens according to claim 5, wherein said step of obtaining is charactersied by said first light intensity variation values being based upon differences in intensity variations of pixels in close proximity to each other; and said second light intensity variation values being based upon differences in pixel light intensities relative to light intensities of pixels in close proximity thereto.

7. A method of autofocusing a two-posit ion lens according to claim 6, wherein said step of using includes the steps of:

calculating ratios based upon said said first light intensity variation values and said second light intensity variation values;

processing at least some of said ratios to provide weighted values of said ratios; and averaging said weighted ratios to provide said focus detection value.

8. A method of autofocusing a two-position lens according to claim 1, further including the step of displaying said image when said focus detection value is within said desired range.

9. A method of autofocusing a two-position lens according to claim 2, further including the step of displaying said second image when said focus detection value indicative of blurr in said second image is acceptable.

10. A method of autofocusing a two-position lens according to claim 2, further including the step of displaying said first image when said focus detection value indicative of blurr in said second image is unacceptable.

11. An optical instrument having a lens with only two focus positions, the instrument comprising:

an image generator for acquiring an image when said lens is in a first position;

a processor for processing pixel light intensities of at least part of said image to provide at least one focus detection value indicative of blurr in said image;

a drive module for providing movement of said lens between said first position and a second position, wherein, in use, said processor determines if said focus detection value is within a desired range, and when said focus detection value is outside of said desired range said drive module automatically moves said lens to said second position.

12. An optical instrument as claimed in claim 11, wherein said image is a first image and in use said processor acquiries a second image when said lens is in said second position;

processes pixel light intensities of at least part of said second image to provide a focus detection value indicative of blurr in said second image; and moves said lens back to said first position if said focus detection value indicative of blurr in said second image is unacceptable.

13. An optical instrument as claimed in claim 12, wherein in use when said focus detection value indicative of blurr in said second image is unacceptable when said focus detection value indicative of blurr in said first image is closer to said range than said focus detection value indicative of blurr in said second image.

14. An optical instrument as claimed in claim 13, wherein in use said processor obtains first light intensity variation values indicative of variations in pixel light intensities in a localized area of said image and second light intensity variation values indicative of variations in pixel light intensities in said localized area of said image, said first light intensity variation values and said second light intensity variation values being obtained by different methodologies; and said processor then uses at least some of said first light intensity variation values and said second light intensity variation values to provide said at least one focus detection value.

* * * * *